(12) United States Patent
Weizman et al.

(10) Patent No.: US 12,114,268 B2
(45) Date of Patent: Oct. 8, 2024

(54) POWER SAVING FOR A MULTI-CONNECTION WIRELESS DEVICE

(71) Applicant: TEXAS INSTRUMENTS INCORPORATED, Dallas, TX (US)

(72) Inventors: Yaniv Weizman, Tel Aviv (IL); Lior Gersi, Kfar Saba (IL); Alex Boiangiu, Ness Ziona (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/502,789

(22) Filed: Nov. 6, 2023

(65) Prior Publication Data

US 2024/0073824 A1     Feb. 29, 2024

Related U.S. Application Data

(63) Continuation of application No. 17/074,091, filed on Oct. 19, 2020, now Pat. No. 11,849,400.

(51) Int. Cl.
*H04W 52/02* (2009.01)
*H04W 4/80* (2018.01)

(52) U.S. Cl.
CPC ......... *H04W 52/0274* (2013.01); *H04W 4/80* (2018.02); *H04W 52/0219* (2013.01)

(58) Field of Classification Search
CPC ............... H04W 52/0274; H04W 4/80; H04W 52/0219; H04W 84/18; Y02D 30/70
See application file for complete search history.

(56) References Cited

U.S. PATENT DOCUMENTS

| | | | |
|---|---|---|---|
| 7,074,091 B2 | 7/2006 | Strayer | |
| 11,302,020 B2 | 4/2022 | Matsuo | |
| 2009/0017879 A1 | 1/2009 | Tsfaty | |
| 2012/0165063 A1 | 6/2012 | Scalia | |
| 2013/0201915 A1 | 8/2013 | Wang | |
| 2014/0329465 A1 | 11/2014 | Palin | |
| 2016/0234678 A1 | 8/2016 | Baum | |
| 2017/0367104 A1 | 12/2017 | Raisoni | |
| 2018/0098338 A1* | 4/2018 | Choi | H04W 76/14 |
| 2018/0184389 A1* | 6/2018 | Gentili | H04W 56/0015 |
| 2019/0327675 A1* | 10/2019 | Takeuchi | H04W 76/14 |
| 2019/0349718 A1 | 11/2019 | Kwon | |
| 2020/0265854 A1* | 8/2020 | Moon | H04R 3/00 |
| 2020/0337100 A1* | 10/2020 | Chirikov | H04W 4/80 |
| 2022/0394794 A1* | 12/2022 | Zhang | H04W 76/15 |

FOREIGN PATENT DOCUMENTS

EP    3573355 A1    11/2019

* cited by examiner

*Primary Examiner* — Jae Y Lee
(74) *Attorney, Agent, or Firm* — Mandy Barsilai Fernandez; Frank D. Cimino

(57) ABSTRACT

A device including a host logic and a wireless controller. The wireless controller includes a transceiver and a scheduler. The scheduler is configured to determine a first device and a second device to cluster together. Further, upon occurrence of a communication event, the scheduler is configured to wakeup the transceiver for a period of time for the transceiver to exchange packets with the first and second devices, exchange a packet with the first device, exchange a packet with the second device, and power down the transceiver.

20 Claims, 4 Drawing Sheets

POWER SAVING FOR A MULTI-CONNECTION WIRELESS DEVICE

CROSS-REFERENCE TO RELATED APPLICATIONS

This application is a continuation of U.S. patent application Ser. No. 17/074,091, filed Oct. 19, 2020, which application is hereby incorporated herein by reference.

BACKGROUND

Bluetooth Low Energy (BLE) is a protocol describing a wireless personal area network. On a BLE piconet (between two BLE devices), data transfers between a central node (also called a "master") and a peripheral device (also called a "slave") occur at periodic time intervals. A "connection event" is an exchange of data between a central node and a single peripheral device. In some applications, the time anchoring of the first connection event instance is determined by the central node as part of a connection establishment procedure between the central node and a peripheral device. To save power, between two sequential connection events the BLE radio frequency (RF) transceivers of the peripheral device and central node device are powered down. The RF transceivers are again powered up just before the beginning of the next anticipated connection event of the same central node/peripheral device connection or other connections in the case of a multi-connection application.

SUMMARY

In one example, a device includes a host logic and a wireless controller. The wireless controller includes a transceiver and a scheduler (e.g., part of the link layer). The scheduler is configured to determine a first device and a second device to cluster together. Further, upon occurrence of a communication event, the scheduler (or other hardware or software based on a scheduler decision) is configured to wake up the transceiver for a period of time for the transceiver to exchange packets with the first and second devices, exchange a packet with the first device, exchange a packet with the second device, and power down the transceiver.

In another example, a method includes determining a first device and a second device to cluster together. Further, upon occurrence of a communication event, the method includes waking up a transceiver for a period of time for the transceiver to exchange packets with the first and second devices, exchanging a packet with the first device, exchanging a packet with the second device, and powering down the transceiver.

BRIEF DESCRIPTION OF THE DRAWINGS

For a detailed description of various examples, reference will now be made to the accompanying drawings in which.

DETAILED DESCRIPTION

If the central node is configured to exchange data with multiple peripheral devices, then for each peripheral device, the central node powers up its RF transceiver, exchanges data packets with that particular peripheral device, and then powers down its RF transceiver. This process repeats for each peripheral device to which the central node is to communicate. As such, the central node repeatedly powers up and down its RF transceiver. The process of powering up and down the transceiver consumes power. For example, to power up the transceiver, one or more software and hardware components are activated or awakened, and to power down the transceiver, the same software and hardware components are deactivated or shutdown.

In accordance with one example, the central node clusters multiple peripheral devices together for communication purposes and, for each BLE anchor point, communicates with each peripheral device of the cluster of peripheral devices in back-to-back connection events. In one example, the peripheral devices that are part of a cluster have the same connection interval The central node powers up its RF transceiver before performing a connection event to the first peripheral device in the cluster and does not power down its RF transceiver until the end of the connection event with the last peripheral device in the cluster. As such, the central node powers up and down its RF transceiver fewer times to communicate with a given set of peripheral devices than would otherwise have been the case if the peripheral devices were not clustered for back-to-back connection events thereby saving power. Saving power is advantageous in a variety of applications such as battery-powered applications.

Figure 1:
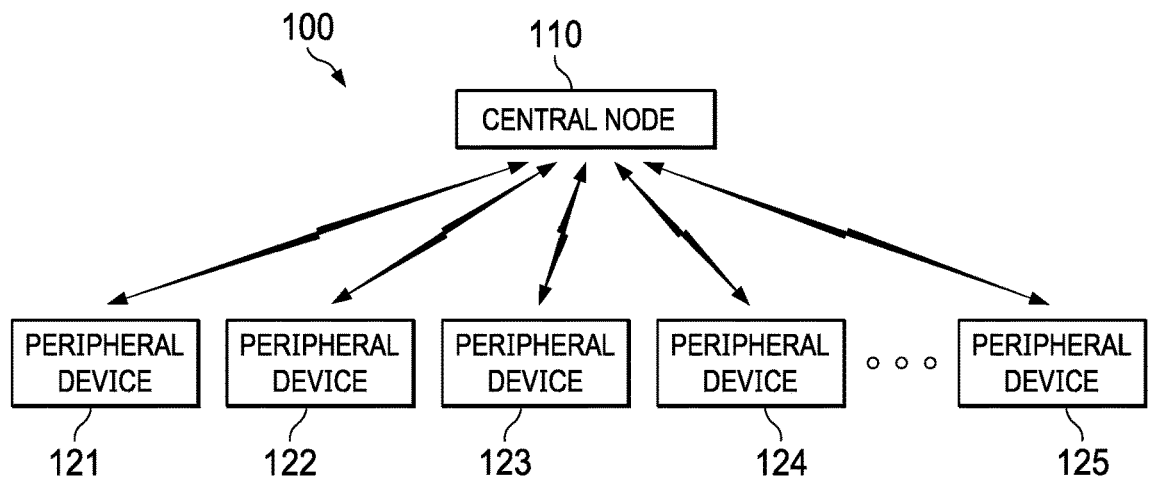
FIG. 1 illustrates a wireless network in which peripheral devices can be clustered together for communications with a central node device.

FIG. 1 illustrates a system 100 including a central node device 110 and multiple peripheral devices 121, 122, 123, 124, and 125. Although five peripheral devices 121-125 are illustrated in this example, in general, any number of peripheral devices can be included. In one example, each peripheral device is, or includes, a sensor (e.g., temperature sensor), and the central node device 110 can retrieve a sensor value from each such sensor. In one implementation, the central node 110 communicates with the peripheral devices 121-125 using a BLE protocol. In accordance with the BLE protocol, anchor points are established by the central node 110 at discrete points in time, for example, at periodic intervals. The interval between anchor points of a BLE connection is referred to as a connection interval. During a connection interval, the central node device 110 can engage in a connection event with a peripheral device, or multiple connection events in the case of multiple peripheral devices being clustered together. For each cluster of peripheral devices, the central node turns on and off its RF transceiver one time during each connection interval (e.g., for each anchor point).

The central node device 110 and peripheral devices 121-125 engage in an advertisement process so that the central node device 110 can determine what peripheral devices are present and within wireless range of the central node device.

For example, each peripheral device 121-125 may transmit an advertising packet, which may include the MAC address of the peripheral device, the identification of the service(s) provided by the peripheral device, the peripheral device's name, and other information. When the central node device 110 determines which peripheral devices 121-125 are present, the central node device clusters two or more of the peripheral devices. Any of a variety of clustering techniques, such as those described below, can be implemented. In each cluster in one example, the connection intervals for the peripheral devices are the same or similar (or integer multiples of a common connection interval). Further, the connection event duration for any given peripheral device within a cluster should be fixed, however, the connection event durations can be the same or different between the various peripheral devices of the cluster. As explained below, the connection event duration for a given peripheral device may be known apriori, determined based on an adaptive learning technique, or enforced by the link layer scheduler (so that it enforces the connection event termination.).

Figure 2:
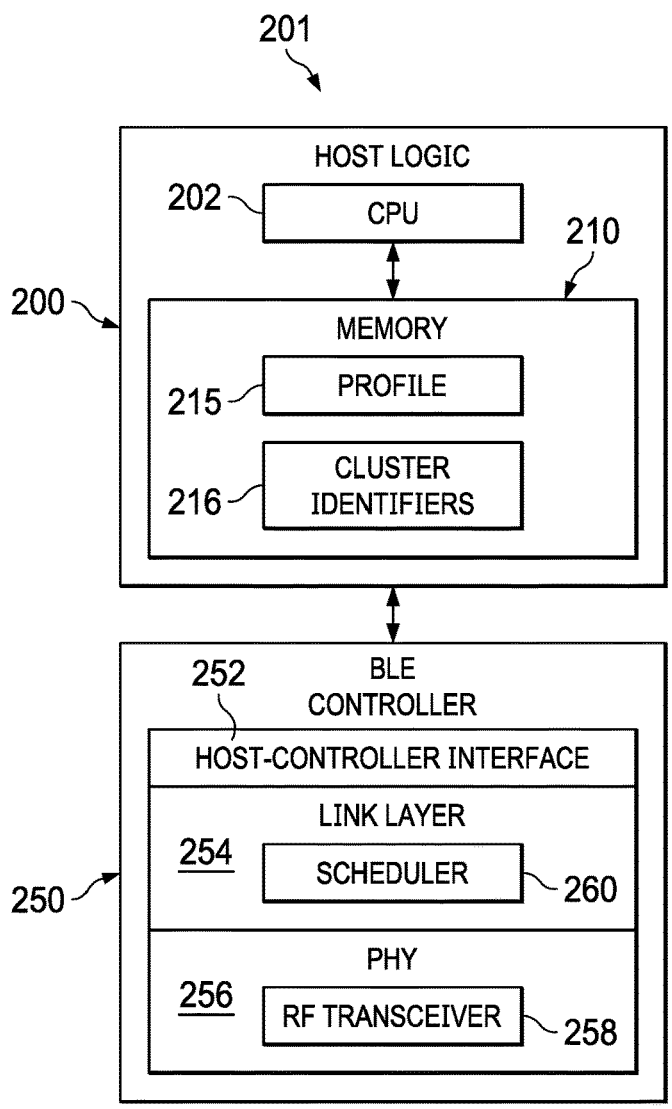
FIG. 2 shows an example implementation of a central node or a peripheral device.

FIG. 2 illustrates an example implementation of a hardware circuit 201 applicable to either or both of a central node device 110 or a peripheral device 121-125. The implementation includes host logic 200 coupled to a wireless controller such as a BLE controller 250. The host logic 200 includes one or more central processing units (CPUs) 202 coupled to, or including, memory 210. Memory 210 includes profile(s) 215, cluster identifiers 216, and host software 217. The host software 217 is executed by the CPU 202 to cause the device to function in the role of either or both of a central node or a peripheral device. The profile(s) 215 and cluster identifiers 216 are described below.

The BLE controller 250 implements multi-layer logic including a host-controller interface 252, a link layer 254, and a physical (PHY) layer 256. The PHY layer 256 includes an RF transceiver 258. A scheduler 260 is implemented within the link layer 254 and is executed by the CPU 202. For a device functioning as a central node, the scheduler 260 determines which peripheral devices 121-125 to cluster and schedules them for back-to-back connection events.

Figure 3:
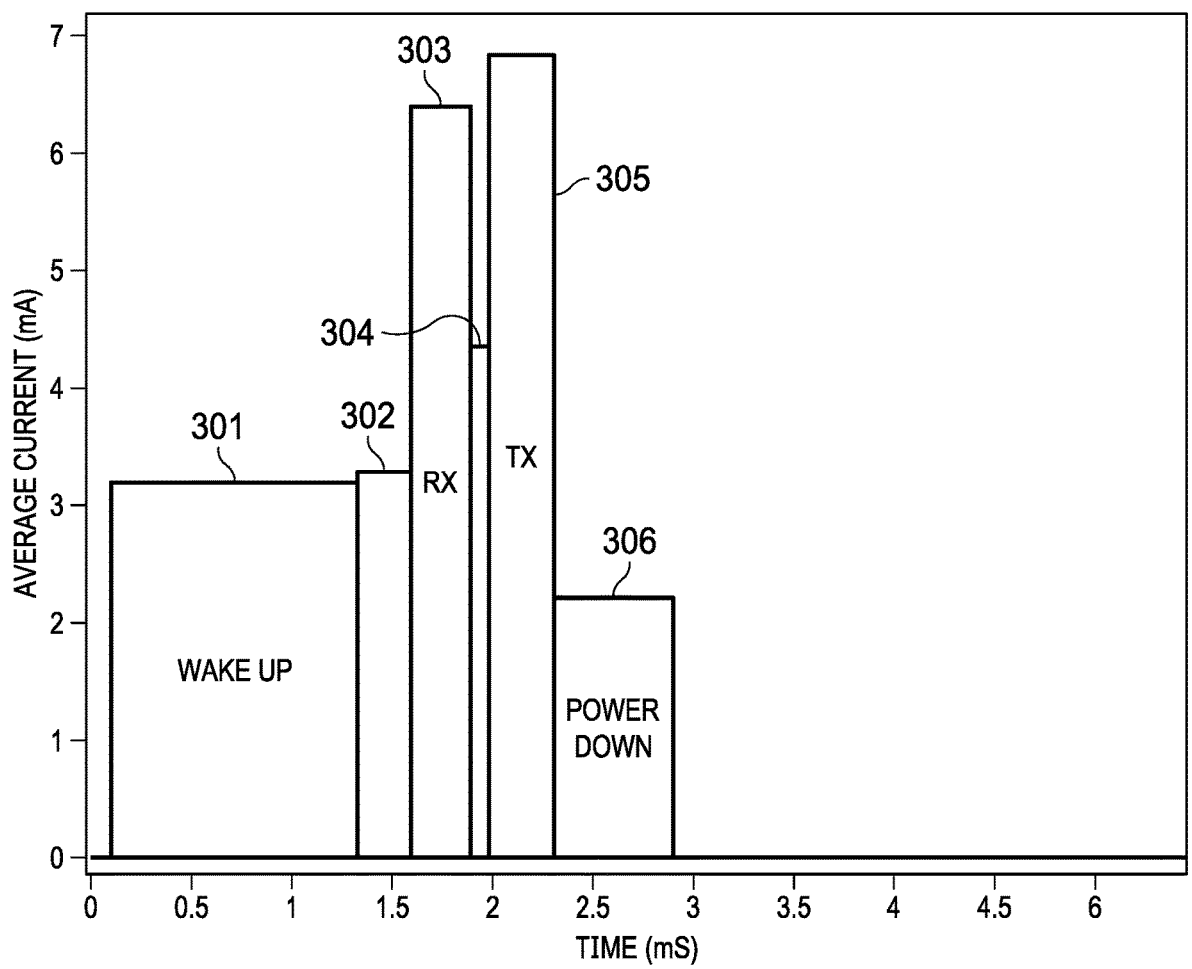
FIG. 3 illustrates a sequence of phases during a single connection event between a peripheral device and a central node device.

FIG. 3 shows an example of a single connection event between the central node device 110 and a peripheral device. The example of FIG. 3 shows multiple phases of the connection event from the perspective of the central node device 110. Each phase occurs over a period of time shown on along the x-axis and is characterized by an average quiescent current during that phase shown along the y-axis. The connection event phases include a wakeup phase 301, CPU active/radio idle phase 302 (in which the CPU 202 is active but the RF transceiver 258 is idle and the transceiver switches from receive to transmit modes), a receive phase 303, a CPU idle/radio ready phase 304 in which the CPU 202 is active and the RF transceiver 258 is ready, a transmit phase 305, and a power down phase 306. A connection event may include a single pair of transmit and receive phases, or multiple pairs of transmit and receive phases. The total time for all of the phases 301-306 to occur is the duration of the connection event.

During the wakeup phase 301, the RF transceiver 258 is transitioned from a sleep state to a wake state. The wakeup phase includes, for example, activating and/or waking up one more software and hardware components, as explained above. The average quiescent current the wakeup phase 301 in this example is approximately 3.2 milliamperes (mA) and its time duration is approximately 1.2 milliseconds (ms) in length. The CPU active/radio idle phase 302 is characterized by an average quiescent current of 3.3 mA and a time duration of approximately 0.3 ms. The receive phase 303, CPU idle/radio phase 304, and transmit phase 305 are characterized by average quiescent current/time durations of approximately 6.5 mA/0.3 ms, 4.5 mA/0.1 ms, and 6.8 mA/0.3 ms, respectively. During the power down phase 306, the central node device 110 deactivates or powers down one or more software and hardware components, and powers down its RF transceiver 258. The power down phase has an average quiescent current of approximately 2.2 mA and a time duration of approximately 0.5 ms.

The energy consumption of the central node device 110 during each phase 301-305 is a function of the product of the quiescent current and time (i.e., the area under the curve for each phase). As can be seen, the combined energy consumption during the wakeup phase 301 and power down phase 306 is a significant portion of the total energy expenditure of all size phases (e.g., 40-50% of the total energy expenditure).

Figure 4:
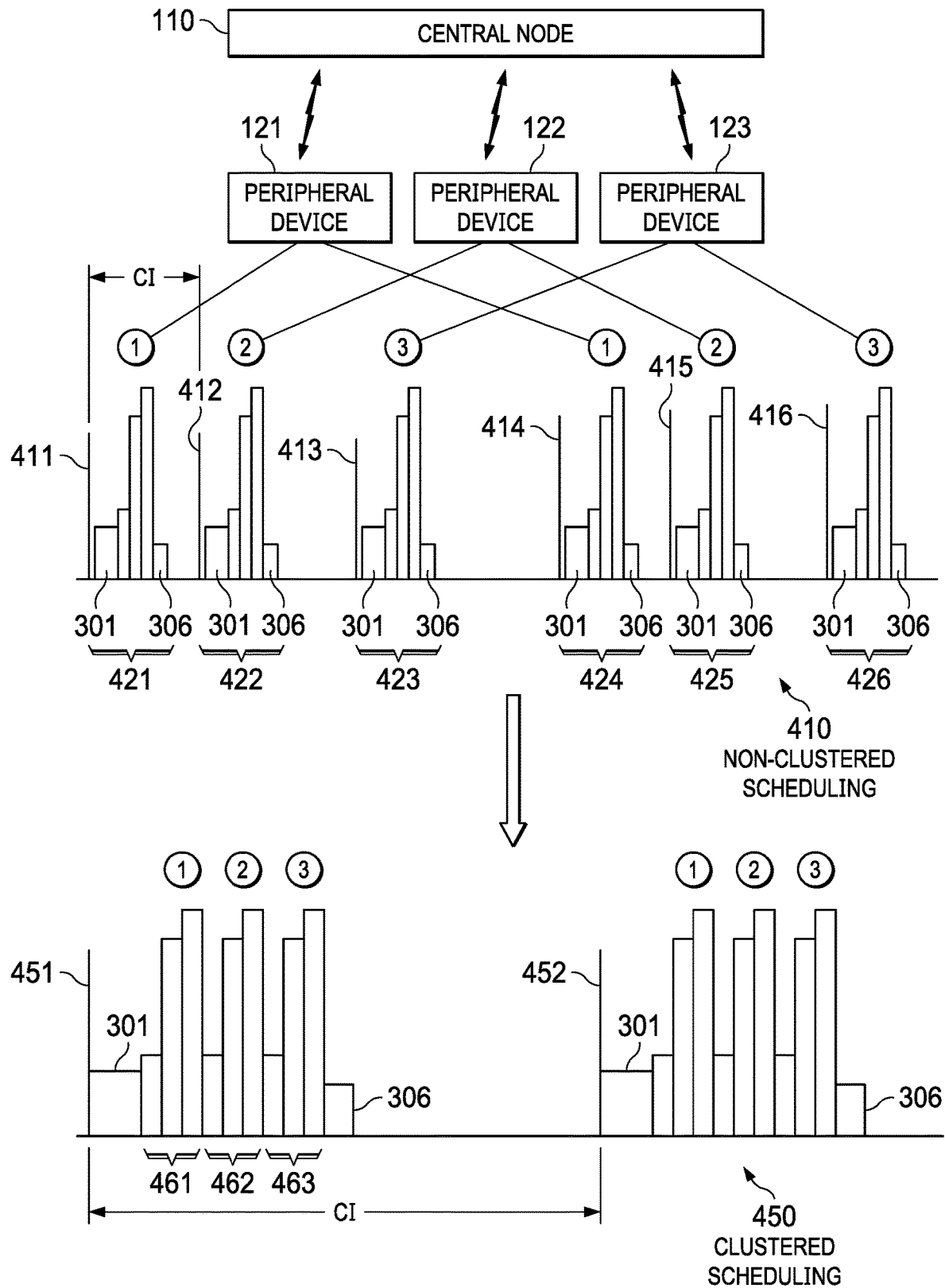
FIG. 4 compares non-clustered scheduling versus clustered scheduling.

FIG. 4 compares non-clustered scheduling 410 to clustered scheduling 450. Three peripheral devices 121, 122, and 123 are illustrated in FIG. 4. For non-clustered (conventional) scheduling 410, the central node device 110 establishes anchor points 411-416, as shown. The connection interval (CI) is illustrated. For each anchor point, the central node device 110 initiates a connection event for one of the peripheral devices. As shown in this example, the central node device initiates a connection event 421 for peripheral device 121 at anchor point 411. The central node device then initiates a connection event 422 for peripheral device 122 at the next anchor point 412, and initiates a connection event 423 for peripheral device 123 at the following anchor point 413. The process then repeats with the central node device 110 again initiating connection events for each of the three peripheral devices at anchor point 414 (connection event 424 for peripheral device 121), at anchor point 415 (connection event 425 for peripheral device 122), and at anchor point 416 (connection event 426 for peripheral device 123). For each of the six connection events 421-426 illustrated in FIG. 4, the central node device 110 performs a wakeup phase 301 and a power down phase 306.

With clustered scheduling (illustrated at 450), the central node device 110 clusters the three peripheral devices 121-123 together and initiates back-to-back connection events with all three clustered peripheral devices 121-123 for each anchor point 451 and 452. At anchor point 451, the central node device 110 performs a wakeup phase 301, then a triplet of a CPU active/radio idle phase 302, a receive phase 303, a CPU active/radio ready phase 304, a transmit phase 305 for each of the three peripheral devices 121 as indicated at 461, 462, and 463, respectively. Following the transmit phase for the connection event to the last peripheral device in the communication order (i.e., peripheral device 123 in this example), the central node 110 performs a power down phase 306. This process repeats at the next anchor point 452. As such, for each anchor point, multiple (three in this example) peripheral devices exchange data with the central node and the central node does not repeatedly power up and down its RF transceiver to communicate with each peripheral device. Instead, the central node device 110 performs one wakeup phase 301 and one power down phase 306 while communicating with multiple peripheral devices. The connection interval (CI) is longer in the context of clustered scheduling to allow more time for the central node device 110 to communicate with multiple peripheral devices.

For the example of non-clustered scheduling 410, the central node device 110 performs six wakeup phases 301 and six power down phases 306 to communicate two times with each of the three peripheral devices 121-123. In the example of clustered scheduling 450, however, the central node device 110 only performs two wakeup phases 301 and two power down phases 306 to communicate two times with each of the three peripheral devices 121-123. Because fewer wakeup and power down phases are needed if peripheral devices are clustered, advantageously less power is consumed by the central node 110.

As explained above, any of multiple different clustering techniques can be employed by the scheduler 260 (FIG. 2) of the central node device 110. In one example, peripheral devices that have fixed durations for connection events and connection intervals are clustered. The memory 210 of the host logic 200 of the central node device 110 may store one or more device profiles 215 (e.g., as a result of the peripheral devices advertising their respective profiles to the central node device), and a profile 215 can be associated with each peripheral device. In one example, a profile for a peripheral device includes a connection event duration and a connection interval for the peripheral device. The connection event duration is a value indicative of the time required for the central node and the peripheral device to transfer data from one to the other. In another example, the device profiles may be provided to the central node 110 from an external shared database. Thus, peripheral devices to which the same profile 215 is associated can be clustered together, that is, the peripheral devices that have generally the same connection interval (or integer multiples thereof) and connection event duration.

In another example, the central node device 110 may perform an adaptive learning technique to determine which peripheral devices should be clustered together. For example, in a sensor network (the peripheral devices are, or have, sensors), two or more of the peripheral devices may transmit the same size data value during each connection event, and thus the connection events are approximately the same duration. Peripheral devices can be clustered together having fixed, but different, duration connection events. The central node device 110 can retain a history log of the connection event time durations for the peripheral devices and then cluster together those peripheral devices having generally the same duration of time for their connection events and connection intervals (or integer multiples thereof). In another example, the central node device 110 obtains the connection event time durations for the peripheral devices from a shared database.

Figure 5:
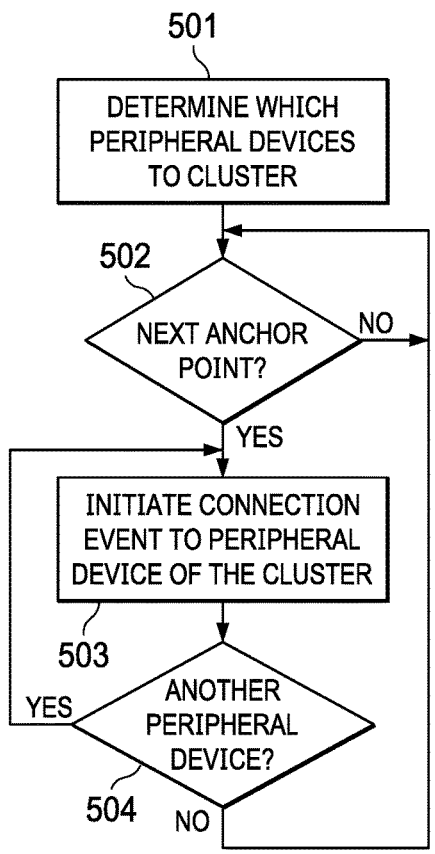
FIG. 5 shows an example method for communications between a central node and multiple peripheral devices.

FIG. 5 illustrates a method for communications between multiple peripheral devices and a central node device. At 501, the central node device 110, via, for example, its CPU 202 executing the scheduler 260, determines which peripheral devices to cluster as explained above. The central node device 110 may store an identifier (e.g., MAC address) of those peripheral devices to be clustered together in memory 210 of the central node device's host logic 200. The cluster identifiers are shown in FIG. 2 as cluster identifiers 216.

As determined at 502, when it is time for the next anchor point, then at 503, the method includes initiating a connection event to a peripheral device of the cluster of peripheral devices. At 504, the method determines whether there is another peripheral device within the cluster for which a connection event has not been initiated for the present anchor point. If there is another peripheral device, then control loops back to operation 503, and a connection event that peripheral device is performed. If connection events to all peripheral devices within the cluster have been performed, then control loops back to 502 and the central node device 110 waits for the next anchor point.

The decision by the central node device as to which peripheral devices to cluster can be made upon initialization of, and by, the central node device as part of a connection establishment phase if the clustering information is known (pre-configured), or periodically during run-time of the central node device (if the clustering information is known and/or for adaptive learning). If one or more additional peripheral devices are added to (or removed from) the network after the initial clustering decision is made, the central node device 110 may update its clustering decision to accommodate and include additional peripheral devices (or remove a peripheral device). In one example, if a connection for a given peripheral device is terminated (e.g., the central node device no longer needs to communicate with that particular peripheral device), the anchor point to one or more of the remaining peripheral devices in the cluster can be changed by the central node device to maintain the remaining peripheral devices in a cluster with back-to-back connections.

In accordance with the BLE protocol, a central node device sets the initial anchor point with respect to its slave peripheral devices, but either the central node device or the peripheral device can initiate a change in the timing of the anchor point. For example, the process to change an anchor point may involve the central node device's link layer sending a BLE_LL_CONNECTION_PARAM_REQ_PDU to a peripheral device. The LL_CONNECTION_PARAM_REQ_PDU includes parameters that can be set by the central node device to specify a change in the timing of an anchor point. In response, the peripheral device can (a) reject the parameter change request with an LL_REJECT_EXT_IND_PDU if the parameters in the request are incompatible with the operation of the peripheral device or (b) accept the new proposed anchor point parameters with an LL_CONNECTION_PARAM_RSP_PDU. Similarly, a peripheral device can send an LL_CONNECTION_PARAM_REQ_PDU to a central node device to request a change in the timing of an anchor point, and the central node device can accept the requested change or reject it.

Figure 6:
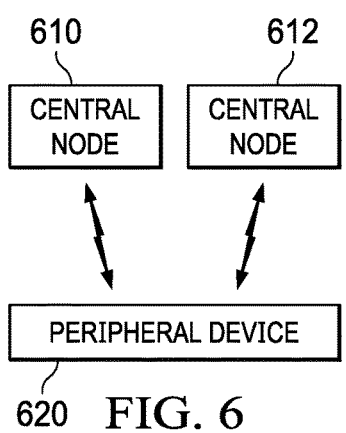
FIG. 6 illustrates multiple central node devices clustered to a peripheral device.

In FIG. 1, a wireless network is illustrated including multiple peripheral devices 121-125 connected to a common central node device 110. FIG. 6 shows an example of a peripheral device 620 having connections to multiple (two in this example) central node devices 610 and 612. Of course, each of the central nodes 610, 612 may have connections to additional peripheral devices as well. Because peripheral device 620 functions as a peripheral device to two different central node devices 610, 612, an opportunity exists to save power by clustering the central node devices together with respect to communications between the central node devices 610, 612 and their common peripheral device 620. In one example, peripheral device 620 issues a request to one of the central nodes 610, 612 to change its anchor point for the peripheral device so that the two central nodes will engage in back-to-back connection events to the common peripheral device 620. For clustered central node devices, the peripheral wakes up its RF transceiver 258 (and activates/powers up any other software or hardware needed for a connection event) at the beginning of the first connection event from one of the central node devices and does not power down its RF transceiver between the connection events of the two central nodes. Instead, the peripheral device 620 does not power down its RF transceiver until the completion of the last connection event (e.g., the second connection in the example of FIG. 6). As such, power is saved by not powering down and then back up the peripheral device's RF transceiver between connection events with the two central node devices 610, 612.

Figure 7:
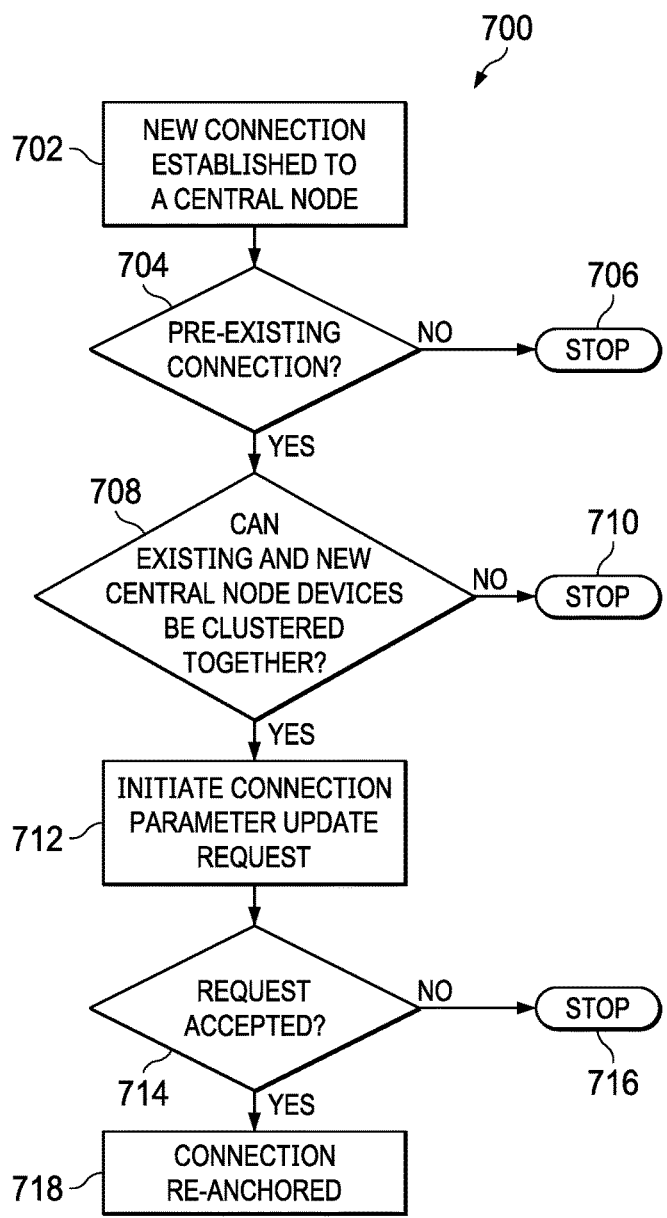
FIG. 7 illustrates a method of clustering multiple central nodes to a peripheral device.

In accordance with the BLE protocol, a peripheral device can request that a central node device change its anchor point for that peripheral device. The BLE protocol permits a connection parameter update procedure to be performed by which one or more parameters regarding a connection between devices can be updated. One of the parameters that can be updated is time at which an anchor point is to occur. As part of the connection update procedure, the peripheral device can request that the central node change the time of the anchor point to a different time value that is specified by the peripheral device in the request. The central node device can accept or reject the request to change the anchor point. If the central node device rejects the request from the peripheral device 620, the central node devices 610 and 612 are not clustered together (i.e., their connection events to the peripheral device are not performed back-to-back). If, however, the central node device accepts the request, then that central node device changes the anchor point for the peripheral device 620 and the connection events from the central node devices 610, 612 are performed back-to-back to the peripheral device 620 such that the peripheral device does not FIG. 7 illustrates an example of the logic performed by the peripheral device 620 to attempt to cluster together the central node devices 610, 620. The logic of FIG. 7 is applicable as well to a central node device that wants to move an anchor point for a peripheral device to better facilitate clustering with one or more other peripheral devices. At block 702, a new connection is established between a peripheral device (e.g., peripheral device 620) and a central node (e.g., one of central nodes 610 or 612). The connection is established with an anchor point for the new central node device. The peripheral device may or may not already have established a connection to another central node device. At decision 704, the peripheral device (using the scheduler 260 in its link layer 254) determines whether the peripheral device already has a connection to another central node. If the answer is "no", then the connection established in block 702 is the only connection to a central node that the peripheral device has, no power savings from clustering central node devices is available, and the process stops at 706. The peripheral device then responds to connection events from the central node device as explained above.

If the answer to decision 704 is "yes," then the connection established at block 702 is not the only connection that the peripheral device has to a central node device, and it is thus possible that the central node devices can be clustered together. At decision 708, the peripheral device (using its scheduler 260) determines whether the existing and new central node devices can be clustered together. This determination depends on whether the connection interval for the peripheral device with its existing central node device and the peripheral device with the new central node device is the same or an integer multiple and whether the connection event durations are the same. If the connection intervals are the same or an integer multiple and if the connection event durations are determined to be the same, then the peripheral device determines that the new central node device should be clustered with the existing central node device. If the answer is "no," then the process stops at 710, and the peripheral device responds to unclustered connection events from all of the central node devices to which it has connections.

If the answer to decision 708 is "yes," then the peripheral device (using scheduler 260) initiates a connection parameter update request (block 712) to the new central node device (i.e., the central node having established the most recent connection in block 702). The connection parameter update request includes a value for a proposed new anchor point. Alternatively, the connection parameter update request can be initiated to the existing central node.

The central node device receiving the connection parameter update request may accept or reject the request. The request may be rejected because, for example, the new proposed anchor point may coincide with an anchor point the central node device already has with another peripheral device. If the request is rejected (decision 714), then the process stops at 716, and the central node devices are not clustered with respect to the common peripheral device. The central node device may return a reject packet to the peripheral device. If, however, the connection parameter update request is accepted, then the central node honors the request by changing the anchor point and communicating or confirming the change in anchor point to the peripheral device (block 718). In this case, the central node device may return an accept packet to the peripheral device. At that point, the central nodes are clustered and perform back-to-back connection events to the common peripheral devices, which results in a power savings by the peripheral device.

Figure 8:
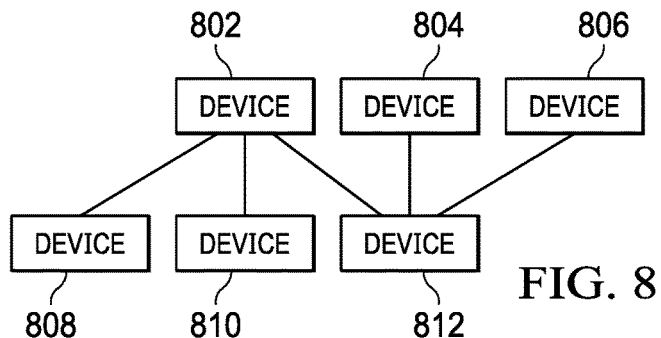
FIG. 8 illustrates an example of a device functioning both as a peripheral device to one central node and as a central node to multiple peripheral devices.

FIG. 8 illustrates a network of devices 802-812. Any of the devices can function in the role of a peripheral device, a central node device, or both. The role performed by a device is implemented by the host logic 200 and BLE controller 250 of the device. Functioning as both a peripheral device and as a central node device (i.e., a multi-role device) means that the device functions as a peripheral device to another central node device, and as a central node device to one or more other peripheral devices. For example, device 802 functions as a central node device with devices 808, 810, and 812 functioning as peripheral devices to device 802. Device 812 also functions as a central node device to devices 804 and 806 (which themselves function as peripheral devices). In general, a device may be a multi-role device in which is connected to multiple peripheral devices (as a central node device) and to multiple central node devices (as a peripheral device). The clustering techniques described herein can be implemented on any device regardless of whether that device is a central node-only device, a peripheral node-only device, or capable of functioning in either a central node device role or a peripheral device role. Further, any given multi-role device can concurrently be a member of more than one cluster. For example, a device can be a member of a cluster of a peripheral devices (for a central node device) and can be a member of a cluster of multiple central node devices.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A method comprising:
    issuing, by a wireless device, a request to a first device to change a first anchor point of the first device so that the first anchor point is adjacent in time with a second anchor point of a second device, wherein the first anchor point is associated with the wireless device, and the second anchor point is associated with the wireless device;
    waking up a transceiver of the wireless device and keeping the transceiver awake for a first duration of time, the first duration of time encompassing the first and second anchor points;
    during the first duration of time,
        exchanging, by the wireless device, a first packet with the first device in a first connection event, and
        exchanging, by the wireless device, a second packet with the second device in a second connection event; and
    powering down the transceiver at an end of the first duration of time.

2. The method of claim 1, wherein issuing the request comprises issuing the request in response to identifying that the first and second devices have fixed durations for connection events and connection intervals.

3. The method of claim 1, wherein issuing the request comprises sending a BLE_LL_CONNECTION_PARAM_REQ_PDU to the first device.

4. The method of claim 1, wherein issuing the request comprises sending a LL_CONNECTION_PARAM_REQ_PDU to the first device.

5. The method of claim 1, wherein a cluster of devices include the first and second devices, the method further comprising:
    powering down the transceiver at an end of the first duration of time;
    after powering down the transceiver, modifying the cluster to include a third device;
    after modifying the cluster, waking up the transceiver for a second duration of time encompassing the first or second anchor points, and a third anchor point associated with the third device; and
    during the second duration of time,
        exchanging, by the wireless device, a third packet with the first device or second device in a third connection event, and
        exchanging a fourth packet with the third device in a fourth connection event; and
    powering down the transceiver at an end of the second duration of time.

6. The method of claim 1, wherein issuing the request comprises issuing the request in response to the first and second devices having a same profile.

7. The method of claim 1, wherein a cluster of devices include the first and second devices, the method further comprising performing an adaptive learning technique to determine the cluster of devices.

8. The method of claim 1, wherein the first and second anchor points are Bluetooth Low Energy (BLE) anchor points.

9. The method of claim 1, wherein the wireless device is a central node.

10. The method of claim 1, wherein the wireless device is a peripheral node.

11. The method of claim 1, wherein connection intervals for the first and second devices each is an integer multiple of a common connection interval.

12. The method of claim 1, wherein the wireless device is a Bluetooth Low Energy (BLE) device.

13. A method comprising:
    identifying first and second devices having fixed durations for connection events and connection intervals;
    causing anchor points for the first and second devices to be adjacent in time;
    waking up a transceiver of a wireless device and keeping the transceiver awake for a first duration of time, the first duration of time encompassing anchor points for the first and second devices;
    during the first duration of time,
        exchanging, by the wireless device, a first packet with the first device in a first connection event, and
        exchanging, by the wireless device, a second packet with the second device in a second connection event; and
    powering down the transceiver at an end of the first duration of time.

14. The method of claim 13, wherein causing the anchor points for the first and second devices to be adjacent in time comprises issuing, by the wireless device, a request to the first device to change a first anchor point of the first device so that the first anchor point is adjacent in time with a second anchor point of the second device, wherein the first anchor point is associated with the wireless device, and the second anchor point is associated with the wireless device.

15. The method of claim 14, wherein issuing the request comprises sending a BLE_LL_CONNECTION_PARAM_REQ_PDU to the first device.

16. The method of claim 14, wherein issuing the request comprises sending a LL_CONNECTION_PARAM_REQ_PDU to the first device.

17. The method of claim 13, wherein a cluster of devices include the first and second devices, the method further comprising:
    powering down the transceiver at an end of the first duration of time;
    after powering down the transceiver, modifying the cluster to include a third device;
    after modifying the cluster, waking up the transceiver for a second duration of time encompassing an anchor point for the first or second device, and an anchor point associated with the third device; and
    during the second duration of time,
        exchanging, by the wireless device, a third packet with the first device or second device in a third connection event, and
        exchanging a fourth packet with the third device in a fourth connection event; and
    powering down the transceiver at an end of the second duration of time.

18. The method of claim 13, wherein the wireless device is a central node.

19. The method of claim 13, wherein the wireless device is a peripheral node.

20. The method of claim 13, wherein the wireless device is a Bluetooth Low Energy (BLE) device.

* * * * *